(12) United States Patent
Mehta et al.

(10) Patent No.: US 7,130,986 B2
(45) Date of Patent: Oct. 31, 2006

(54) DETERMINING IF A REGISTER IS READY TO EXCHANGE DATA WITH A PROCESSING ELEMENT

(75) Inventors: Kalpesh D. Mehta, Chandler, AZ (US); Louis A. Lippincott, Chandler, AZ (US); Eric F. Vannerson, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 562 days.

(21) Appl. No.: 10/609,706

(22) Filed: Jun. 30, 2003

(65) Prior Publication Data

US 2004/0268101 A1    Dec. 30, 2004

(51) Int. Cl.
*G06F 15/82*    (2006.01)

(52) U.S. Cl. .................... 712/27; 712/18; 712/25; 712/26

(58) Field of Classification Search ............... 712/18, 712/25, 26, 27, 201
See application file for complete search history.

(56) References Cited

U.S. PATENT DOCUMENTS

| 4,922,418 A | * | 5/1990 | Dolecek ................. 714/51 |
| 6,697,935 B1 | * | 2/2004 | Borkenhagen et al. ...... 712/228 |

* cited by examiner

*Primary Examiner*—William M. Treat
(74) *Attorney, Agent, or Firm*—Buckley, Maschoff & Talwalkar LLC

(57) ABSTRACT

According to some embodiments, it is determined if a register is ready to exchange data with a processing element.

23 Claims, 9 Drawing Sheets

DETERMINING IF A REGISTER IS READY TO EXCHANGE DATA WITH A PROCESSING ELEMENT

BACKGROUND

A processing element may read data from (or write data to) a register. In some cases, the processing element could be delayed or stalled if the register is not ready to provide (or receive) the data. Moreover, this type of stall condition might reduce the performance of a system (e.g., if the processing element could be performing other tasks instead of being stalled).

DETAILED DESCRIPTION

Some embodiments described herein are associated with a "processing element." As used herein, a processing element may refer to any element capable of reading data from a register, performing an operation on data, and/or writing data to a register. A processing element may be associated with, for example, a Digital Signal Processor (DSP), an Application Specific Integrated Circuit (ASIC) device, and/or a Field Programmable Gate Array (FPGA) device. According to some embodiments, a processing element is a hardware specific accelerator, such as a filter, an encoder, or a decoder accelerator.

Figure 1:
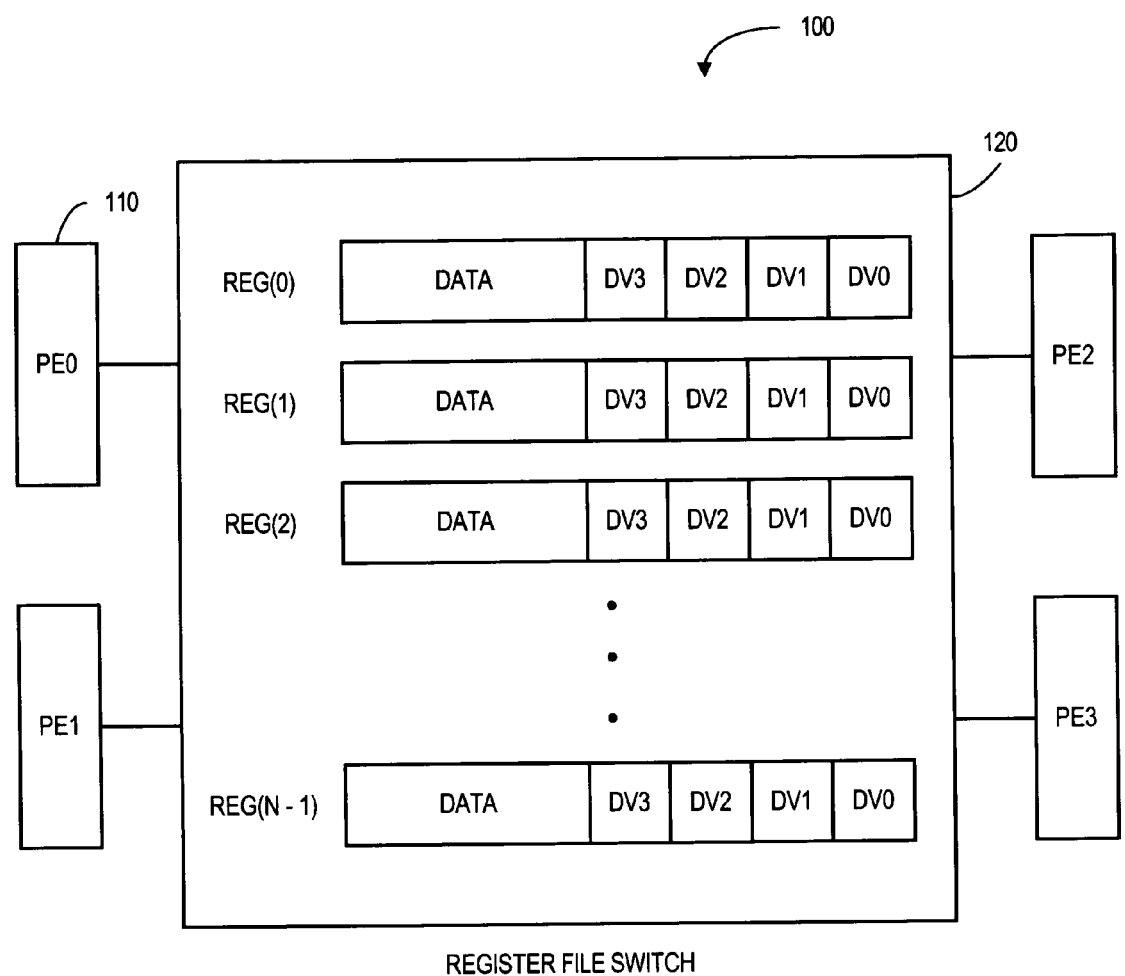
FIGS. 1 through 4 are block diagrams of a processing unit.

For example, FIG. 1 is block diagram of a processing unit 100 that includes four processing elements 110 (PE0 through PE3). Each processing element 110 is coupled to a register file switch 120 that includes registers REG(0) through REG(N-1). Note that each processing element 110 might also have a number of local registers. As used herein, the term "register" may refer to, for example, a general purpose register and/or a cluster communication register (e.g., a register used to exchange information within a cluster or processing elements).

The processing unit 100 may have a "data flow" and/or "data driven" architecture. For example, a relatively small set of instructions may operate on a relatively large data stream exchanged via the register file switch 120 (e.g., via a sixteen-bit path).

Figure 9:
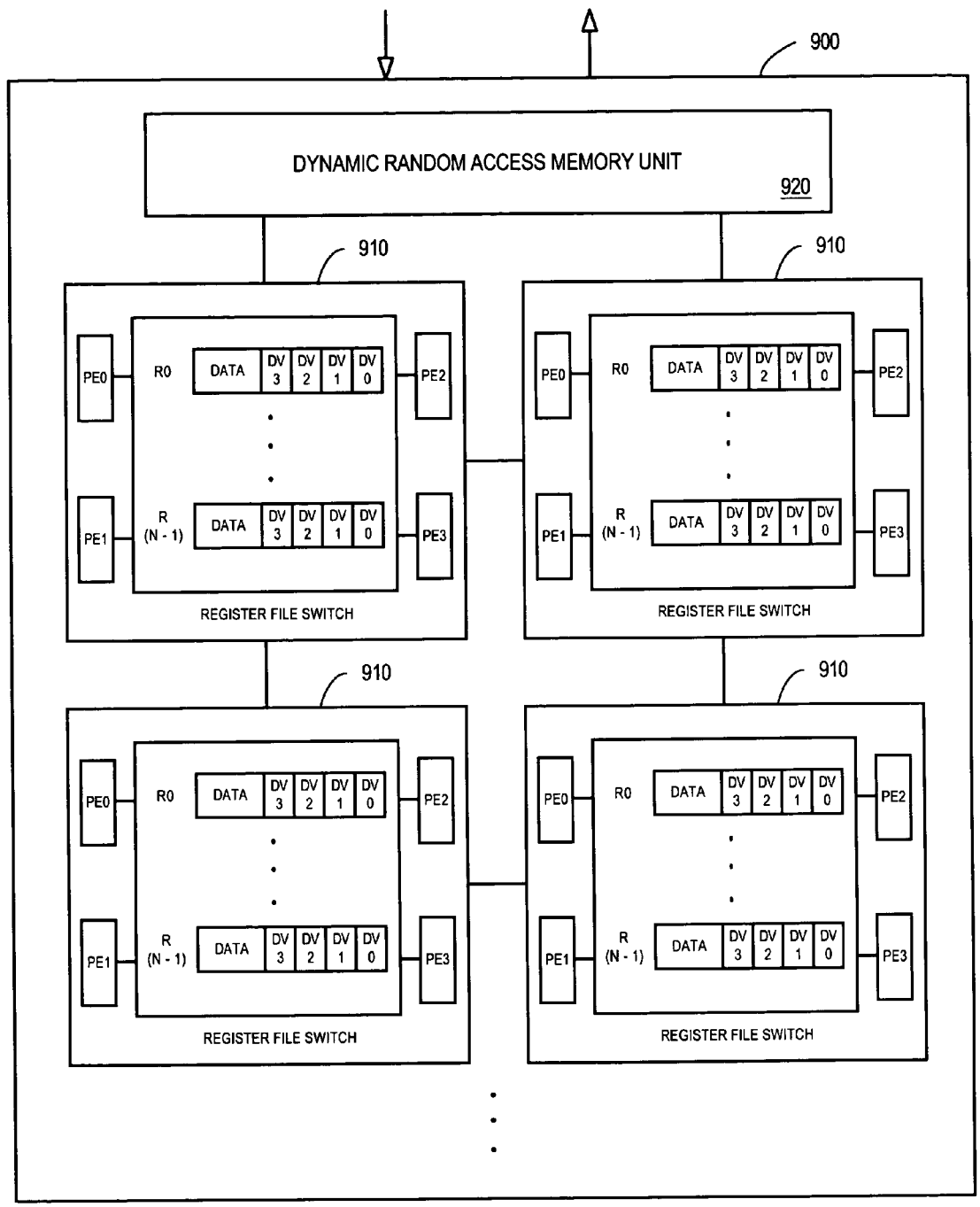
FIG. 9 is a block diagram of an image processing system according to some embodiments.

A processing element 110 may read data from and/or write data to any of the registers. In this way, a first processing element 110 can exchange information with another processing element 110 via the register file switch 120. Note that a processing element 110 could also act as an input processing element (e.g., to receive data from other devices and provide the data to other processing elements 110) or an output processing element (to receive data from other processing elements 110 and provide the data to other devices). For example, as illustrated in FIG. 9 a device may include a number of image signal processors 910, with each image signal processor 910 having a number of processing elements (e.g., PE0 through PE3). In this case, an input processing element might receive data from other image signal processors 910 and/or a memory unit 920 and pass the data to another processing element within that image signal processor 910 as appropriate (e.g., via a register). Similarly, an output processing element might receive data from other processing elements within an image signal processor 910 (e.g., via a register) and pass the information to other image signal processors 910 and/or a memory unit 920 as appropriate.

Each register stores data along with a data valid bit for each of the processing elements 110 (bits DV0 through DV3). When a register contains data to be provided to (or consumed by) a processing element 110, the data valid bit associated with that processing element is set. Consider, for example, FIG. 2. In this case, REG(2) contains data to be provided to PE3 (because bit DV3 is set to "1"). Note that a register might not contain any data to be provided to any processing element 110 (in which case bits DV0 through DV3 would all be "0"). Moreover, a register might contain data to be provided to more than one processing element 110 (e.g., bits DV0 and DV2 could be "1" while bits DV1 and DV3 are "0").

Of course, according to other embodiments a "0" could instead indicate that a register contains data for a particular processing element 110.

Figure 2:
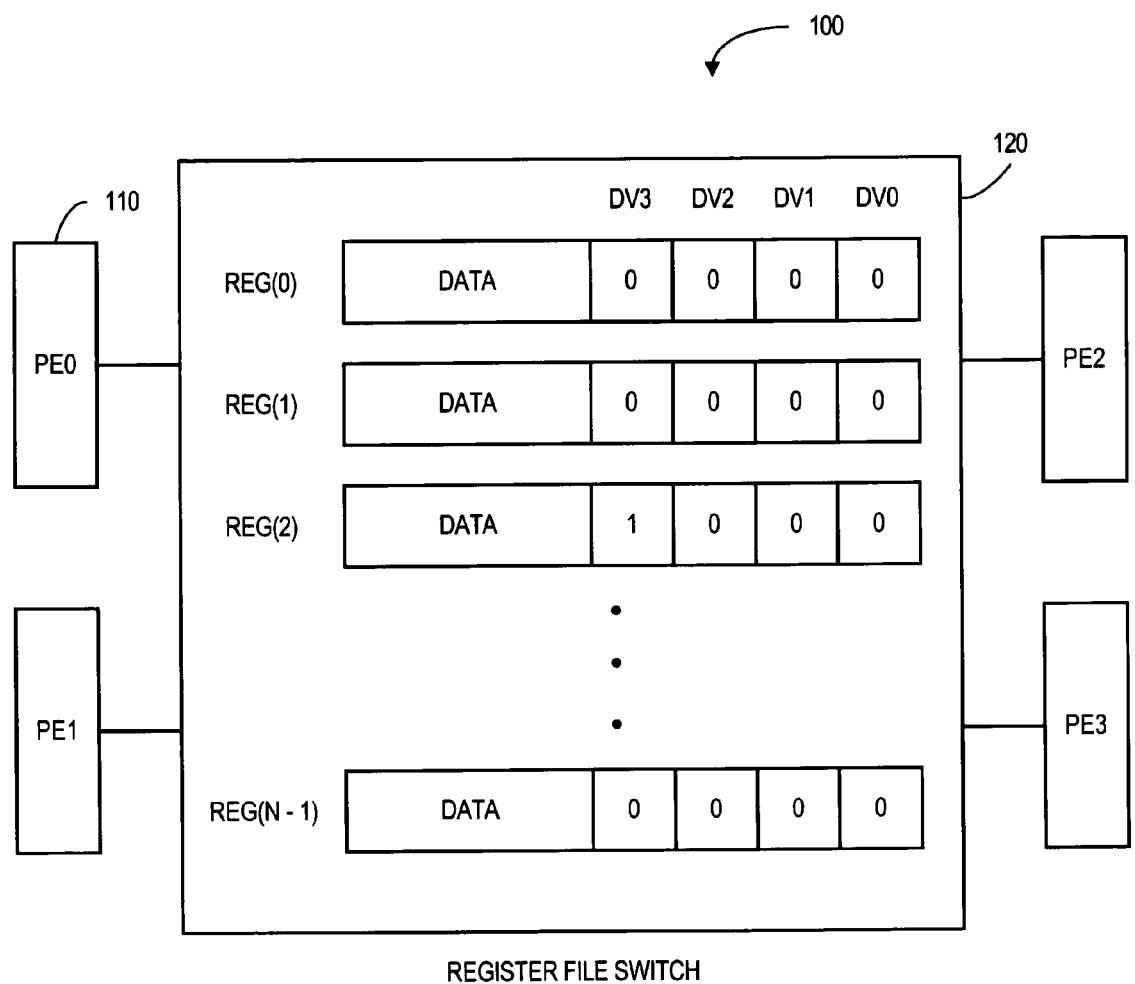

Consider now a task to be performed by PE0. In particular, the task includes a set of instructions that reads data from REG(0), performs one or more operations on the data, and writes the result into REG(2). As illustrated in FIG. 2, however, REG(0) does not currently have any data to provide to PE0 (because bit DV0 is "0"). As a result, PE0 may "stall" (e.g., PE0 might simply wait until REG(0) has data for PE0).

Figure 3:
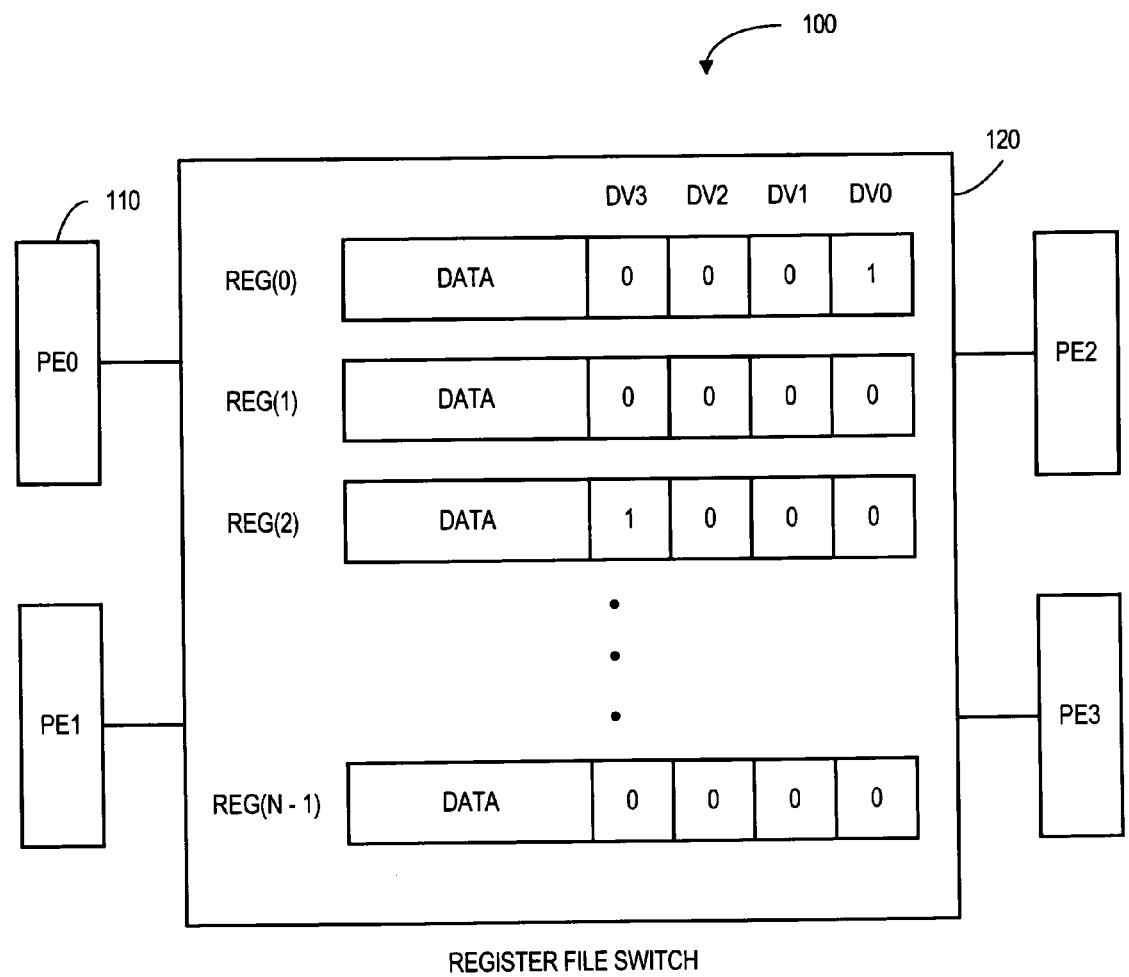

Referring now to FIG. 3, bit DV0 for REG(0) is now set to "1"—indicating that the register has data to provide to PE0. Thus, PE0 can begin to perform the task by reading data from REG(0). Note that the task also needs to write a result to REG(2). As shown in FIG. 3, however, REG(2) currently has data for PE3. As a result, PE0 will be unable to write the result into REG(2) until after PE3 reads the data that is currently stored in REG(2). This is another case in which PE0 may become stalled.

Figure 4:
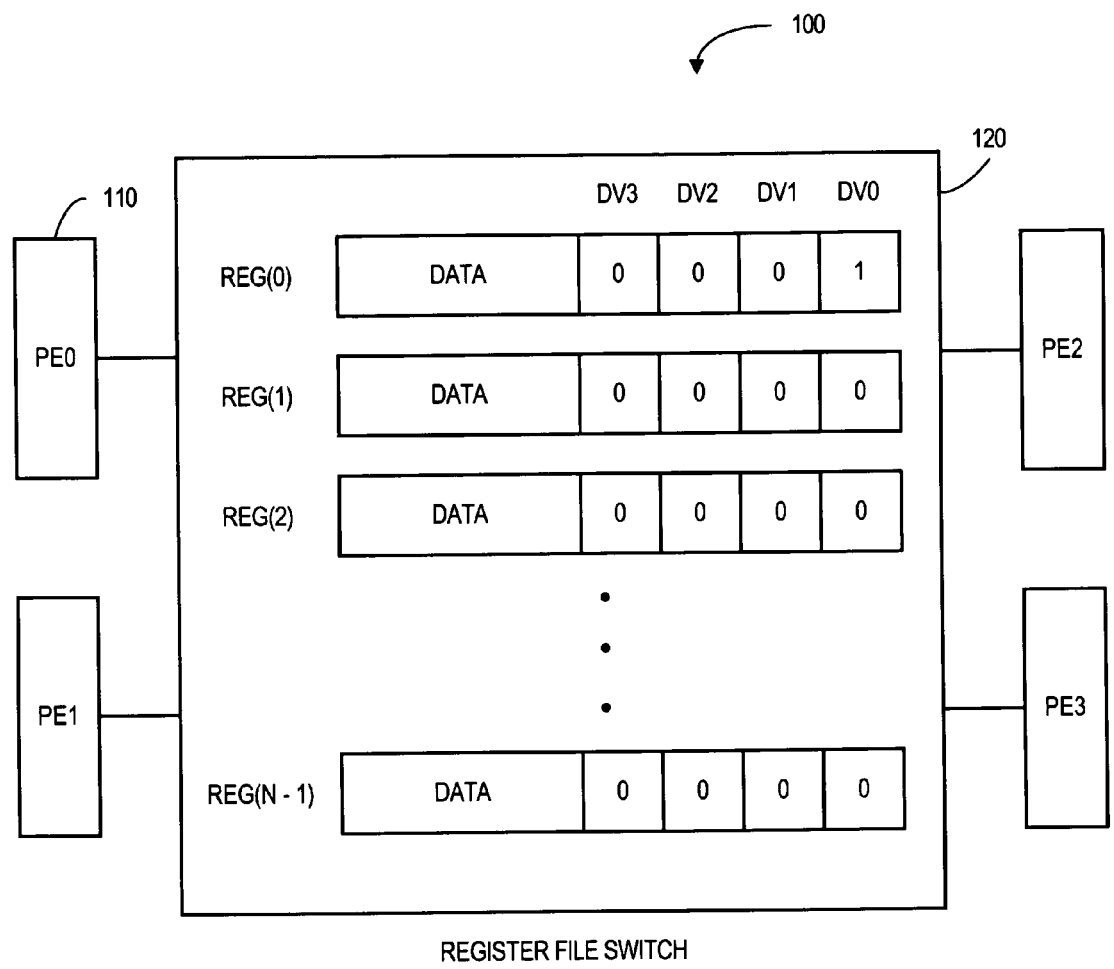

Referring to FIG. 4, PE0 is now able to perform the entire task. That is, PE0 can both read data from REG(0) (because bit DV0 is "1") and write data to REG(2) (because bits DV0 through DV3 are all "0").

In some cases, a stalled processing element 110 will not significantly reduce the performance of the processing unit 100. For example, if a processing element 110 has only one task to perform, then waiting for a register to become available may not significantly reduce performance. If, however, the processing element 110 has another task it could perform (e.g., another thread of instructions that will not need to exchange data with the register causing the stall), then waiting for that register to become available might reduce performance (e.g., because that other task is being unnecessarily delayed).

Determining if a Register is Ready to Provide Data

Figure 5:
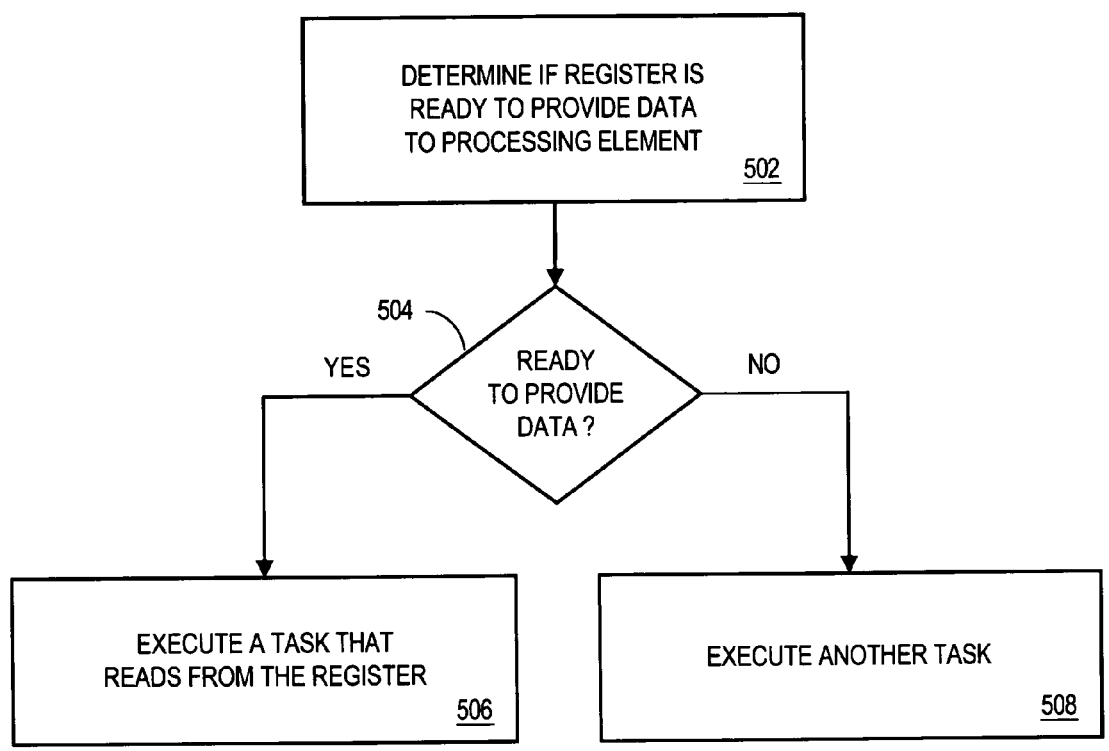
FIG. 5 is a method of determining if a register is ready to provide data according to some embodiments.

FIG. 5 is a method of determining if a register is ready to provide data according to some embodiments. The flow charts described herein do not necessarily imply a fixed order to the actions, and embodiments may be performed in any order that is practicable. The method of FIG. 5 may be associated with, for example, a processing element 110. Note that any of the methods described herein may be performed by firmware, hardware, software, or any combination of these techniques. For example, a storage medium may store thereon instructions that when executed by a machine result in performance according to any of the embodiments described herein (e.g., via code to be assembled or micro-code).

At 502, it is determined whether or not a register is ready to provide data to a processing element. For example, a data valid bit associated with that processing element may be examined to determine if data is currently available for the processing element. Note that the register may have data available for more than one processing element at the same time.

If the register is ready to provide data at 504, a task that reads from that register is executed at 506. If the register is not ready to provide data at 504, another task is executed instead at 508.

By way of example, consider a processing element Z that might perform a task that reads data from REG(X). In this case, the following instruction could be executed before the task is performed:

TEST_DV_READ regX and a flag might be set if bit DVZ for REG(X) is equal to "1." The processing element could then perform the task if the flag is set (or perform another task if the flag is not set). In this way, a task that would have otherwise resulted in a stall might be avoided.

Determining if a Register is Ready to Receive Data

Figure 6:
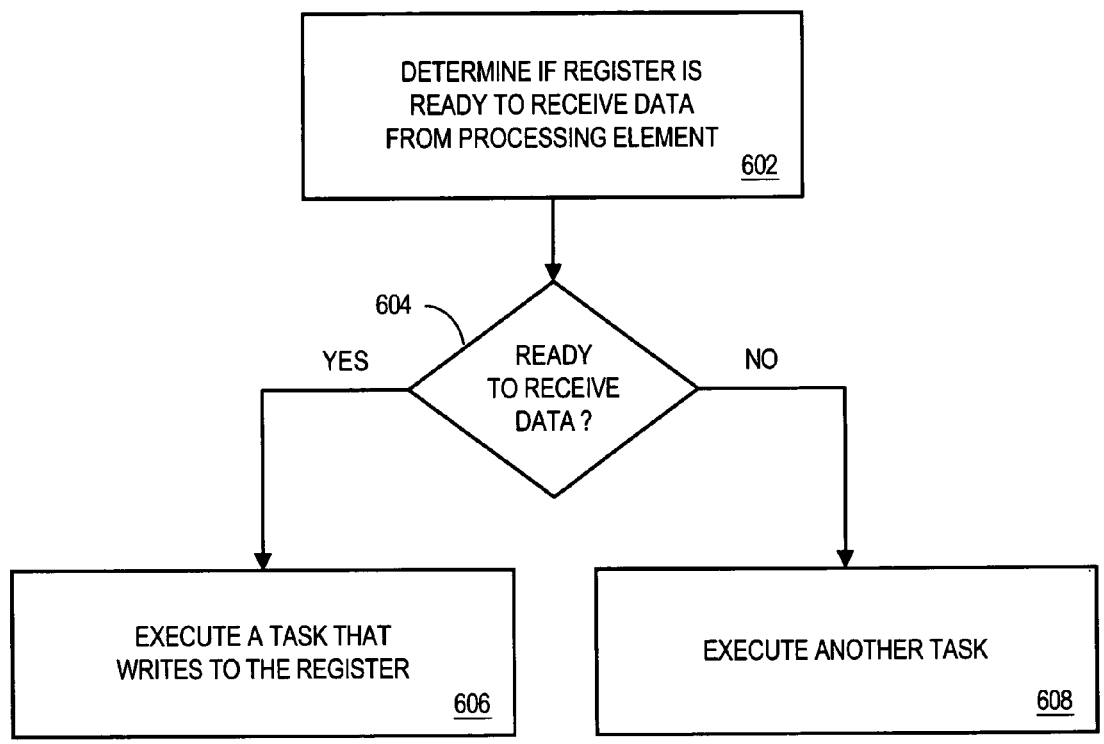
FIG. 6 is a method of determining if a register is ready to receive data according to some embodiments.

FIG. 6 is a method of determining if a register is ready to receive data according to some embodiments. At 602, it is determined whether or not a register is ready to receive data from a processing element. For example, data valid bits associated with other processing elements might be examined to determine if valid data is currently available for those processing elements.

If the register is ready to receive data at 604, a task that writes to that register is executed at 606. If the register is not ready to receive data at 604, another task is executed at 608.

By way of example, consider a processing element Z that might perform a task that writes data to REG(X). In this case, the following instruction could be executed before the task is performed:

TEST_DV_WRITE regX and a flag might be set if all of the DV bits for REG(X) are equal "0." Note that the DV bit associated with processing element Z might be excluded from this determination (e.g., when processing element Z sets that DV bit to "1" to take control of REG(X) by preventing other processing elements from exchanging data with that register). The processing element could then perform the task if the flag is set (or perform another task if the flag is not set). Again, a task that would have otherwise resulted in a stall might be avoided.

EXAMPLE

Figure 7:
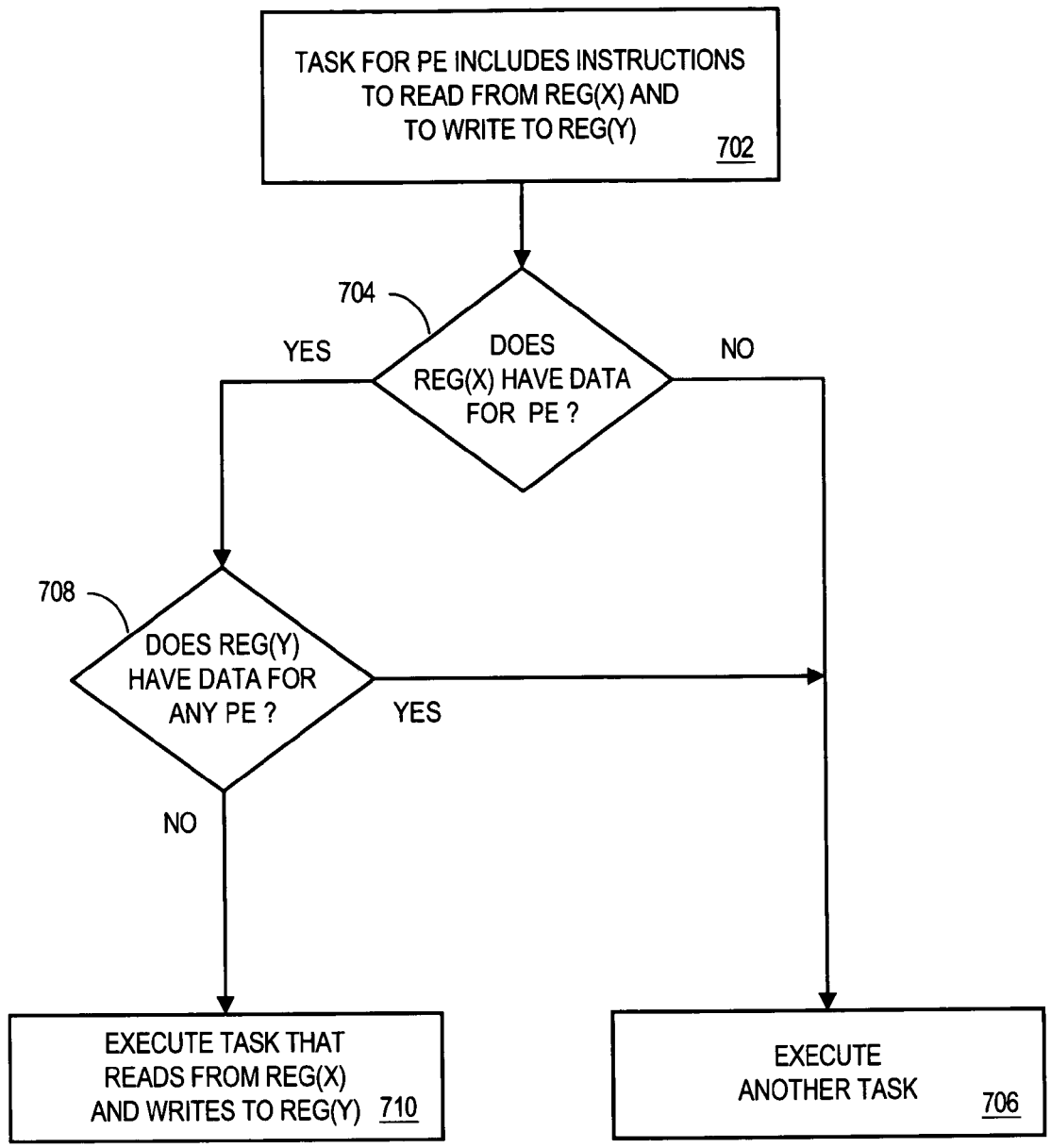
FIG. 7 is an example of a method according to some embodiments.

FIG. 7 is an example of a method according to some embodiments. In particular, a task that needs to both read data from REG(X) and write data to REG(Y) is identified at 702. In this case, the following instruction could be executed before the task is performed:

TEST_DV_READ/WRITE regX, regY and a flag might be set only if (i) the DVZ for REG(X) is equal to "1" at 704 and (ii) all of the DV bits for REG(Y) are equal "0" at 708. As before, the DV bit associated with processing element Z might be excluded from the determination at 708. The processing element then performs the task at 710 if the flag is set (or perform another task if the flag is not set at 706).

According to still another embodiment, the following instruction may be executed before a task is performed:

TEST_DV purposeX, regX, purposeY, regY where purposeX indicates whether the task will read data from (or write data to) the register associated with regX and purposeY indicates whether the task will read data from (or write data to) the register associated with regY. Note that this type of instruction could support situations where a task needs to write to (or read from) two different registers.

Assume that the instruction is associated with processing element Z, and that a purposeX (or purposeY) of "0" indicates that the task will read data from the register while a "1" indicates that the task will write data to the register. In this case:

TEST_DV 0, 3, 1, 5 executed by PE1 (e.g., the task will read from REG(3) and write to REG(5)) might result in a flag being set as follows:

flag={reg3.dv1} AND {NOR{reg5.dv0, reg5.dv1, . . . , reg5.dv(n-1)}} where regA.dvB represents bit DVB for register A. Note that reg5.dv1 might be excluded from the NOR operation (when PE1 sets that bit to take control of REG(5)).

Assembler and Automated Code Evaluation

Figure 8:
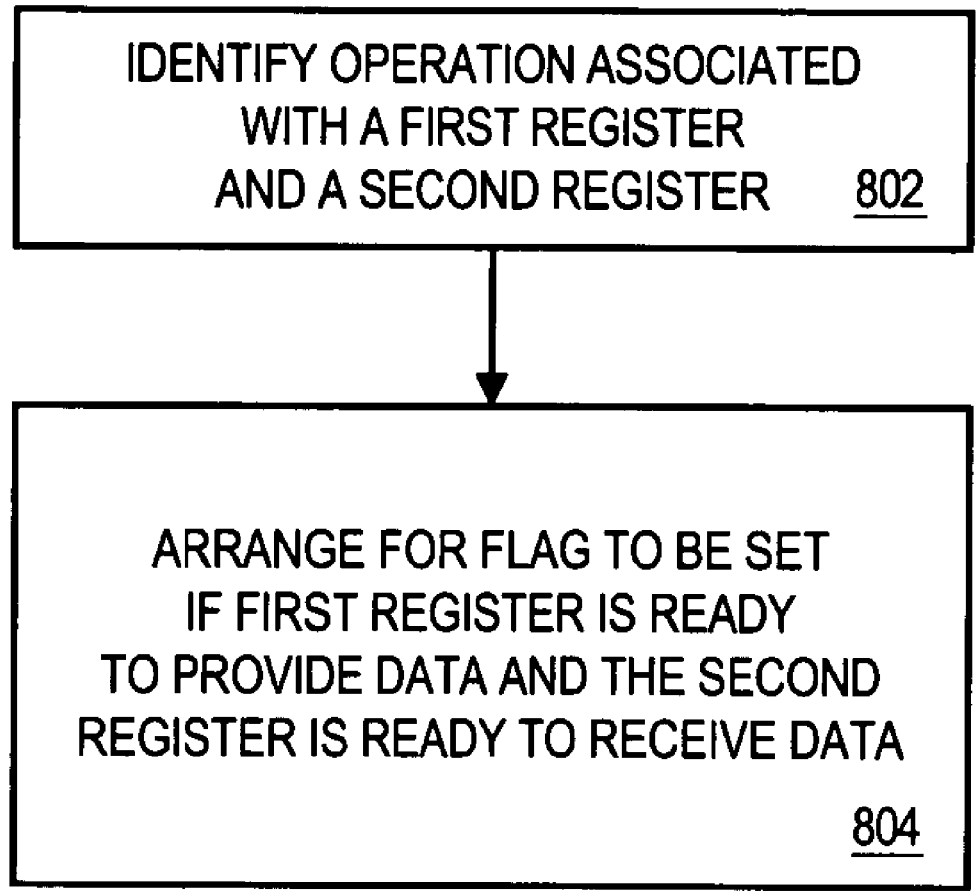
FIG. 8 is a method that may be performed by an assembler according to some embodiments.

FIG. 8 is a method that may be performed by an assembler (e.g., a micro-code assembler) according to some embodiments. In particular, at 802 an operation associated with a first register and a second register is identified (e.g., by identifying a TEST_DV_READ/WRITE or TEST_DV instruction).

At 804, the assembler arranges for a flag to be set if the first register is ready to provide data and the second register is ready to receive data. For example, when a TEST_DV purposeX, regX, purposeY, regY instruction is encountered for processing element Z, hardware associated with the processing unit might arrange for the flag to be set as follows:

```
if (purposeX = 1)
    flag_a = ~ (OR (regX.dv0, regX.dv1, . . . , regX.dv(n-1)));
else
    flag_a = regX.dvZ;
end if;
if (purposeY = 1)
    flag_b = ~ (OR (regY.dv1, regY.dv1, . . . , regY.dv(n-1)));
else
    flag_b = regY.dvZ;
end if
flag = flag_a AND flag_b;
```

As before, regX.dvZ and regY.dvZ might be excluded from the OR operations. Note that hardware may implement the TEST_DV functionality (e.g., using AND and OR gates) and the logic may be executed it in a single cycle.

According to some embodiments, an evaluation of program code (e.g., a series of instructions) may be automated. For example, the program code might have multiple threads and an application may evaluate the code to determine relationships and/or dependencies associated with those threads. Such an application could then suggest or automatically insert TEST_DV instructions as appropriate to reduce stalls.

System

FIG. 9 is a block diagram of an image processing system 900 according to some embodiments. The image processing system 900 includes a number of image signal processors 910 that operate in accordance with any of the embodiments described here.

The system 900 may receive information, process information (e.g., in connection with color conversion, compression, and/or filter operations), and provide information (e.g., for document or video image processing). The system 900 may, for example, be associated with a digital copier, a scanner, a printer, and/or a Multi-Function Peripheral (MFP) device.

The image processing system 900 may also include a Dynamic Random Access Memory (DRAM) unit 920, such as a Double Data Rate (DDR) SDRAM accessed via a Direct Memory Access (DMA) interface. According to other embodiments, the image processing system 900 instead uses another type of memory unit.

The image signal processors 910 may, for example, be connected together in a mesh configuration. For example, each image signal processor 910 might be quad-port device that is connected to up to four other image signal processors 910 and/or DRAM units 920. Note that although two columns of image signal processors 910 are illustrated in FIG. 9, any number of columns could be provided instead. Moreover, although a single DRAM unit 920 is illustrated in FIG. 9, multiple DRAM units could be included in the system 900 (e.g., a first DRAM unit could be coupled to a top row of image signal processors 910 while a second DRAM unit is coupled to a bottom row of image signal processors 910).

Additional Embodiments

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Although embodiments have been described as having a particular number of processing elements, any number of processing elements could be included in a system. Similarly, although a particular topography has been illustrated (e.g., the cross-bar switch arrangement of FIGS. 1 through 4), embodiments may be associated with any shared register topography.

The several embodiments described herein are solely for the purpose of illustration. Persons skilled in the art will recognize from this description other embodiments may be practiced with modifications and alterations limited only by the claims.

What is claimed is:

1. A method, comprising:
   determining at a first processing element if a first register is ready to provide data to the first processing element;
   if the first register is ready to provide data, executing a first task that reads from the first register; and
   if the first register is not ready to provide data, executing a second task,
   wherein the first register is also associated with a second processing element, and
   wherein the first register contains a data valid indication corresponding to the first processor element and the second processor element.

2. The method of claim 1, wherein the determining comprises:
   evaluating a data valid indication associated with the first processing element and arranging for the first task to be executed if data is currently available for the processing element.

3. The method of claim 1, wherein the first task also writes to a second register and further comprising:
   determining whether the second register is available to receive data, wherein the first task is only executed if the second register is available to receive data.

4. The method of claim 1, wherein the determining comprises:
   evaluating a data valid indication associated with the second processing element and only executing the first task if no data is currently available for the second processing element.

5. The method of claim 1, wherein the first task is associated with at least one of: a data flow architecture, or at least one of a data driven architecture.

6. An apparatus, comprising:
   a plurality of processing elements; and
   a register file switch coupled to the plurality of processing elements and including a first register,
   wherein the first register contains a data valid indication corresponding to each processor element of the plurality of processing elements,
   wherein at least one processing element is to determine if the first register is ready to provide data to that processing element, and to (i) execute a task that reads from the first register if the first register is ready to provide data and (ii) execute another task if the first register is not ready to provide data.

7. The apparatus of claim 6, wherein the register file switch includes a second register, the task that reads from the first register also writes to the second register, and the at least one processing element is further to determine if the second register is ready to receive data, and to (i) execute the task if the second register is ready to receive data and (ii) execute the other task if the second register is not ready to receive data.

8. The apparatus of claim 6, wherein the plurality of processing elements comprises an input processing element, and an output processing element.

9. The apparatus of claim 6, wherein the first register comprises at least one of: a general purpose register, or at least one of a cluster communication register.

10. An apparatus, comprising:
    a processor;
    a medium storing instructions adapted to be executed by the processor to perform a method, the method comprising:
    determining at a first processing element if a first register is ready to provide data to the first processing element;
    if the first register is ready to provide data, executing a first task that reads from the first register; and
    if the first register is not ready to provide data, executing a second task,
    wherein the first register is also associated with a second processing element, and
    wherein the first register contains a data valid indication corresponding to the first processor element and the second processor element.

11. The apparatus of claim 10, wherein the task that reads from the first register also writes to a second register, and execution of the instructions further results in:
   determining if the second register is ready to receive data,
   if the second register is ready to receive data, executing the task, and
   if the second register is not ready to receive data, executing the other task.

12. A method, comprising:
   identifying an operation for a first processing element, the operation being associated with a first register and a second register;
   determining if the first register is ready to provide data to the processing element;
   determining if the second register is ready to receive data;
   if the first register is ready to provide data and the second register is ready to receive data, providing a first indication; and
   if the first register is not ready to provide data or the second register is not ready to receive data, providing a second indication
   wherein the first register is also associated with a second processing element, and
   wherein the first register contains a data valid indication corresponding to the first processor element and the second processor element.

13. The method of claim 12, wherein said providing an indication includes setting a flag if (i) the first register currently has data to be provided to the processing element and (ii) the second register does not currently have data to be provided to any other processing element.

14. An apparatus, comprising:
   a processor;
   a medium storing instructions adapted to be executed by the processor to perform a method, the method comprising:
   identifying an operation for a first processing element, the operation being associated with a first register and a second register,
   determining if the first register is ready to provide data,
   determining if the second register is ready to receive data,
   if the first register is ready to provide data and the second register is ready to receive data, providing a first indication, and
   if the first register is not ready to provide data or the second register is not ready to receive data, providing a second indication
   wherein the first register is also associated with a second processing element, and
   wherein the first register contains a data valid indication corresponding to the first processor element and the second processor element.

15. The apparatus of claim 14, wherein said providing a second indication includes setting a flag if (i) the first register currently has data to be provided to the processing element and (ii) the second register does not currently have data to be provided to any other processing element.

16. A method, comprising:
   identifying an operation for a processing element, the operation being associated with a first register identifier and a first register purpose; and
   depending on the first register purpose, arranging to provide an indication associated with (i) whether the first register is ready to provide data or (ii) whether the first register is ready to receive data.

17. The method of claim 16, wherein the operation is further associated with a second register identifier and a second register purpose and further comprising:
   depending on the second register purpose, providing an indication associated with (i) whether the second register is ready to provide data or (ii) whether the second register is ready to receive data.

18. An image processing system, comprising:
   a dynamic random access memory unit; and
   a plurality of image signal processors, wherein at least one image signal processor is coupled to the memory unit and at least one image signal processor includes:
   a plurality of processing elements, and
   a register file switch coupled to the plurality of processing elements and including a first register,
   wherein are least one processing element is to determine if the first register is ready to provide data, and to (i) execute a task that reads from the first register if the first register is ready to provide data and (ii) execute another task if the first register is not ready to provide data,
   wherein the first register contains a data valid indication corresponding to each processor element of the plurality of processing elements.

19. The image processing system of claim 18, wherein the register file switch includes a second register, the task that read from the first register also writes to the second register, and the at least one processing element is further to determine if the second register is ready to receive data, and to (i) execute the task if the second register is ready to receive data and (ii) execute the other task if the second register is not ready to receive data.

20. A method, comprising:
   determining at a first processing element if a first register is ready to receive data from the first processing element;
   if the first register is ready to receive data, executing a first task that writes data to the first register; and
   if the first register is not ready to receive data, executing a second task
   wherein the first register is also associated with a second processing element, and
   wherein the first register contains a data valid indication corresponding to the first processor element and the second processor element.

21. The method of claim 20, wherein the register is also associated with at least one other processing element, and said determining comprises:
   evaluating a data valid indication associated with each other processing element and only executing the first task if no data is currently available for the other processing elements.

22. A method, comprising:
   determining at a first processing element whether or not a first register is ready to exchange data with the first processing element;
   if the first register is ready to exchange data, executing a first thread of instructions that exchanges data with the first register; and
   if the first register is not ready to exchange data, executing a second thread of instructions,
   wherein the first register is also associated with a second processing element, and
   wherein the first register contains a data valid indication corresponding to the first processor element and the second processor element.

23. The method of claim 22, wherein the processing element comprises at least one of: a digital signal processor, or at least one of an application specific integrated circuit device, or at least one of a field programmable gate array device, or at least one of a hardware accelerator, or at least one of an input processing element, and or at least one of an output processing element.

* * * * *